(12) United States Patent
Opperthauser

(10) Patent No.: US 6,315,006 B1
(45) Date of Patent: Nov. 13, 2001

(54) PIPE INSULATION COUPLING

(75) Inventor: Orval A. Opperthauser, Atlantis, FL (US)

(73) Assignee: Hydra-Zorb, Co., Auburn Hills, MI (US)

( * ) Notice: Subject to any disclaimer, the term of this patent is extended or adjusted under 35 U.S.C. 154(b) by 0 days.

(21) Appl. No.: 09/781,774

(22) Filed: Feb. 12, 2001

(51) Int. Cl.⁷ .......................................................... F16L 9/14
(52) U.S. Cl. ............................ 138/149; 138/157; 138/166
(58) Field of Search ................................... 138/149, 157, 138/165, 166, 167, 112

(56) References Cited

U.S. PATENT DOCUMENTS

| Re. 34,332 | * | 8/1993 | Adams et al. | 138/155 |
|---|---|---|---|---|
| 1,820,845 | | 8/1931 | Sterling . | |
| 2,089,909 | | 8/1937 | Mansfield . | |
| 2,919,721 | | 1/1960 | Isenberg . | |
| 2,980,568 | | 4/1961 | Kuzmierowicz . | |
| 3,058,860 | | 10/1962 | Rutter . | |
| 3,095,337 | | 6/1963 | Chase . | |
| 3,163,448 | * | 12/1964 | Franklin | 138/112 |
| 3,289,704 | | 12/1966 | Nicosia . | |
| 3,559,660 | * | 2/1971 | Rollins | 138/149 |
| 3,642,308 | * | 2/1972 | Zeile, Jr. et al. | 138/149 |
| 4,122,298 | * | 10/1978 | Brandy | 138/112 |
| 5,158,114 | * | 10/1992 | Botsolas | 138/149 |
| 5,797,415 | * | 8/1998 | Nicholson et al. | 138/149 |
| 6,056,019 | * | 5/2000 | Dubois | 138/149 |
| 6,196,272 | * | 3/2001 | Davis et al. | 138/149 |

* cited by examiner

Primary Examiner—James Hook
(74) Attorney, Agent, or Firm—Clark Hill PLC

(57) ABSTRACT

A pipe insulation coupling for coupling adjacent facing ends of elongated cylindrical pipe insulation tubing encased around a fluid pipe includes an elongated body extending longitudinally between a first end and a second end. The elongated body includes a pair of C-shaped clam shell portion interconnected by a living hinge for pivotal movement between an open position for receiving the pipe and a closed position clamped around the pipe and insulation tubing. Each clam shell portion includes an outer tube wall and an inner tube extending longitudinally between the first and second ends and defining a channel therebetween for receiving the adjacent facing ends of the insulation tubing. A planar wall interconnects the outer tube wall and the inner tube wall midway between the ends to abut the adjacent ends of the insulation tubing. Each of the outer tube wall and inner tube wall include a tapered inner surface extending from the planar wall to the first and second ends to gradually decrease the width of the channel to frictionally retain the adjacent ends of the insulation tubing within the channel along opposing sides of the planar wall.

18 Claims, 5 Drawing Sheets

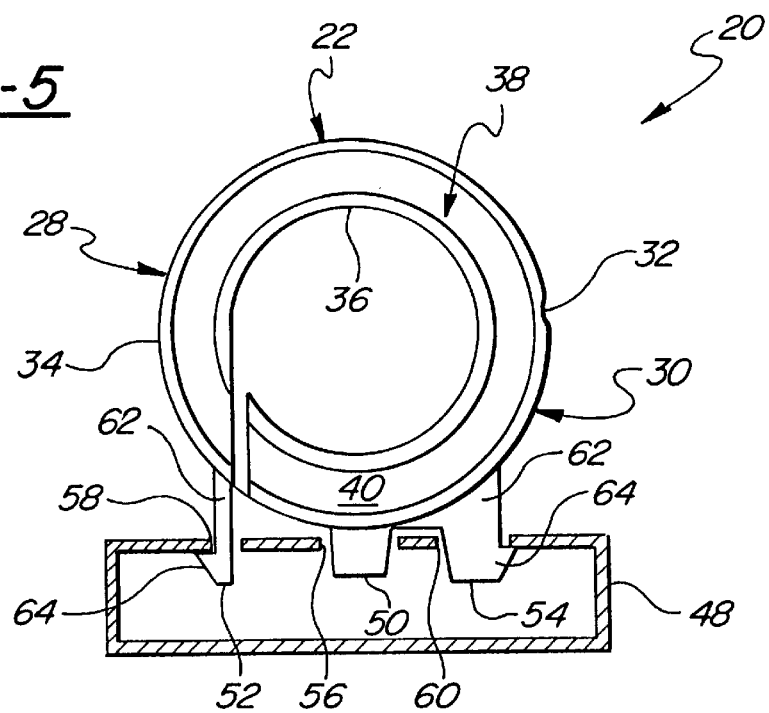
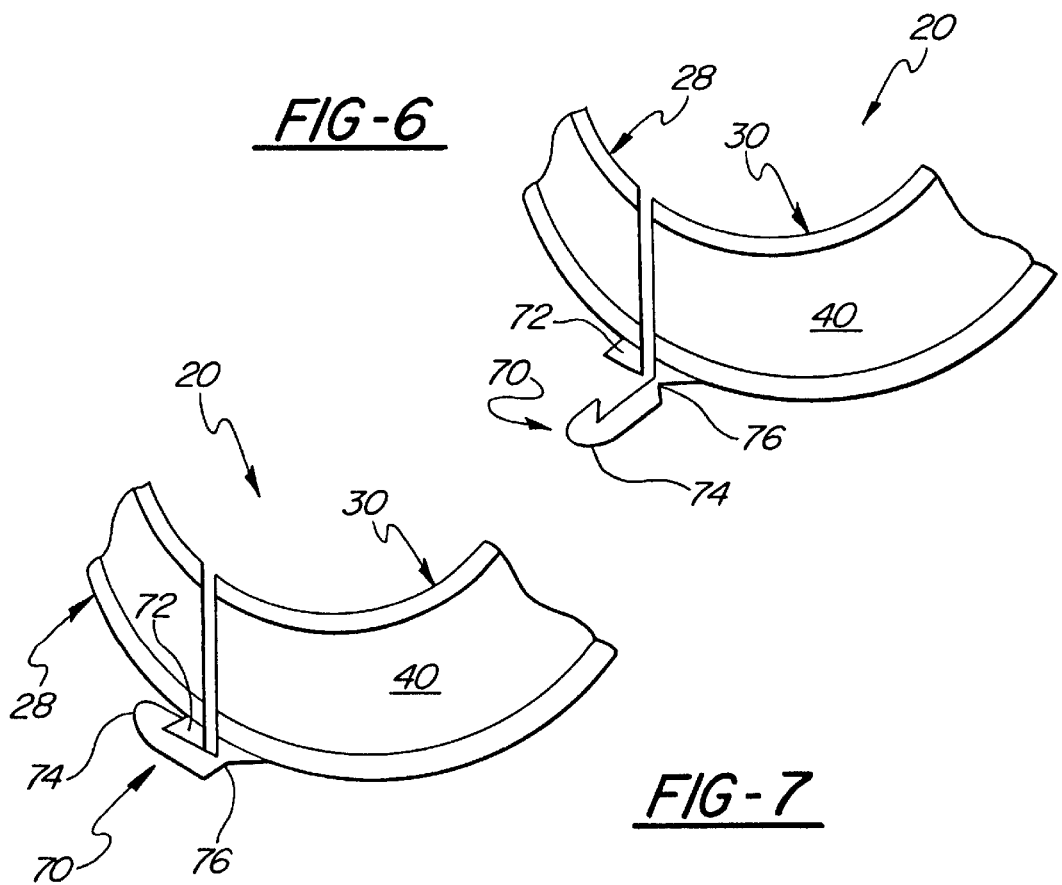

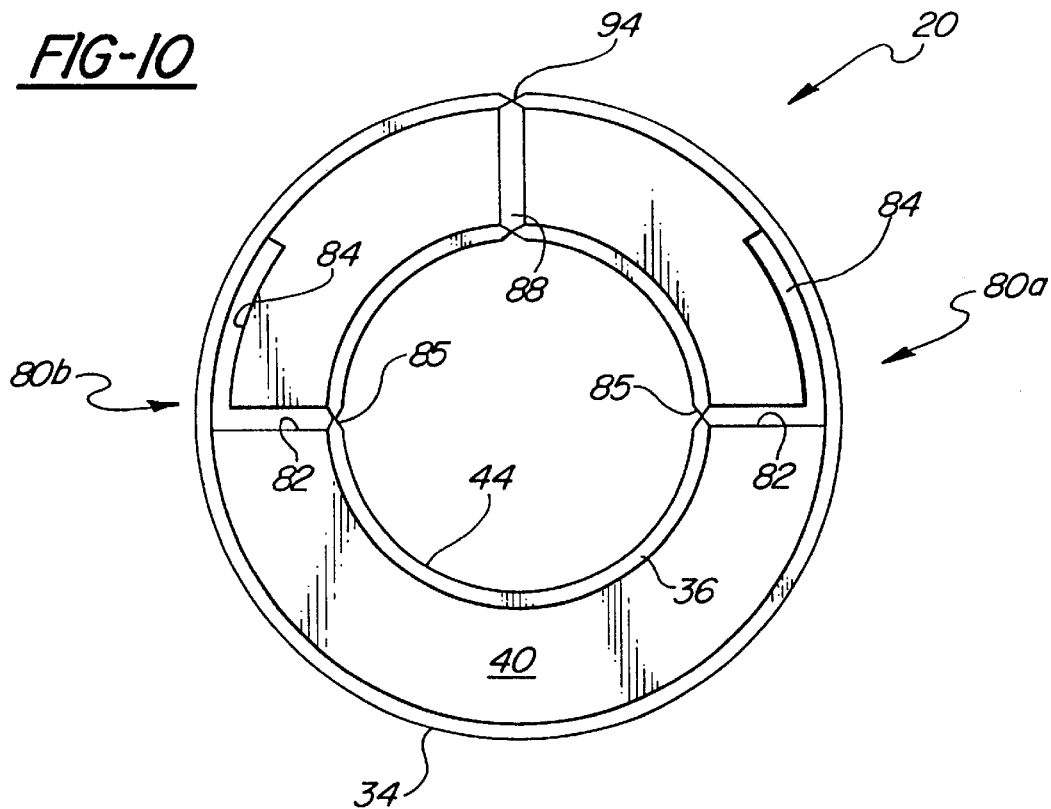
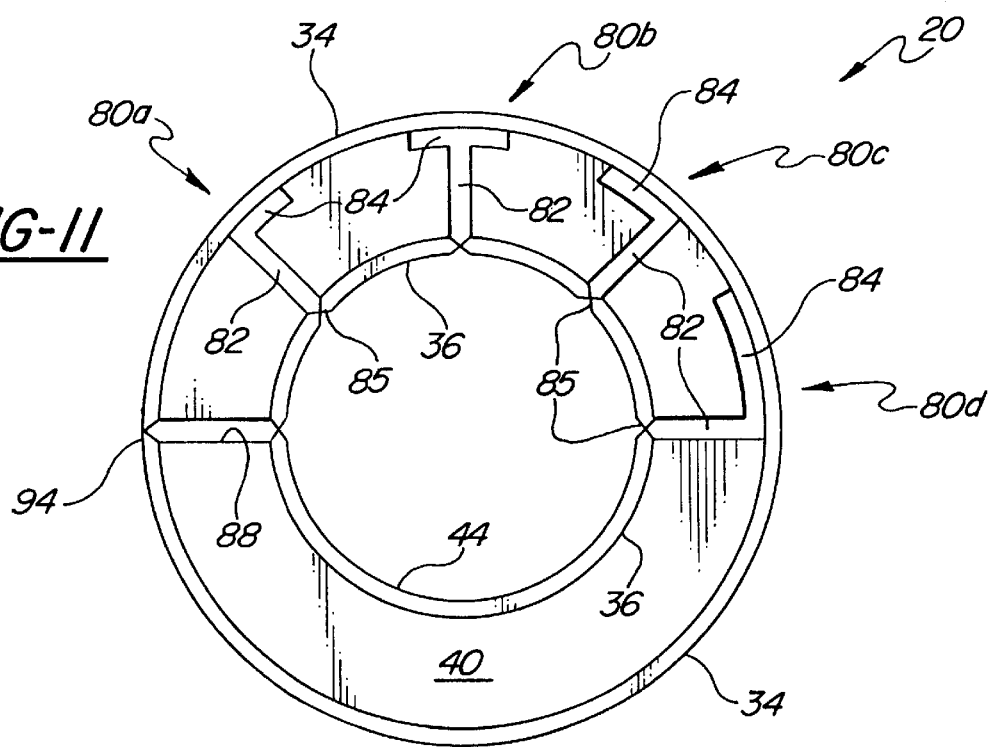

PIPE INSULATION COUPLING

BACKGROUND OF THE INVENTION

1. Field of the Invention

The present invention relates generally to a pipe insulation coupling, and more particularly, to a pipe insulation coupling for coupling adjacent ends of pipe insulation tubing encased around an elongate fluid pipe.

2. Description of the Related Art

Conventional pipes used for conveying or transferring fluids, such as refrigeration pipes, water pipes, and the like, are commonly encased in a cellular foam insulation tubing. The insulation tubing is typically provided in predetermined lengths and aligned longitudinally and end-to-end along the length of the pipe. It is desirable to prevent the separation between adjacent facing ends of the insulation tubing to increase the insulation characteristics and efficiency of the pipe. The adjacent ends of the insulation tubing are typically interconnected by tape, adhesive or straps. However, this type of interconnection is labor intensive, costly and inefficient. Mechanical means and closure mechanisms have also been employed for attachment to insulation tubing such as those disclosed in U.S. Pat. Nos. 1,820,845; 2,919,721; 3,058,860 and 3,289,704.

It remains desirable to provide a coupling which may be easily attached to the pipe between sections of insulation tubing for receiving and coupling adjacent facing ends of longitudinally aligned insulation tubing encased about the pipe.

SUMMARY OF THE INVENTION

The present invention is a pipe insulation coupling for coupling adjacent ends of elongated pipe insulation tubing comprising an elongated body extending along a longitudinal axis between a first end and a second end. The elongated body includes a cylindrical outer tube wall extending along the longitudinal axis between the first end and the second end. The elongated body further includes a cylindrical inner tube wall spaced inwardly from and generally parallel to the outer tube wall and extending along the longitudinal axis between the first end and the second end. The inner tube wall and the outer tube wall defining an elongated channel therebetween adapted to receive adjacent ends of the pipe insulation tubing. The coupling also includes a planar wall positioned transverse to the longitudinal axis for interconnecting the outer tube wall and the inner tube wall midway between the first and second ends and adapted to abut the adjacent ends of the pipe insulation tubing. The coupling further includes at least one of the outer tube wall and the inner tube wall having a tapered inner surface extending from the planar wall to each of the first and second ends for gradually decreasing the space between the outer tube wall and the inner tube wall defined by the channel to frictionally retain the adjacent ends of the pipe insulation tubing within the channel along opposing sides of the planar wall.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a cross-sectional end view of an alternative embodiment of the pipe insulation coupling attached to a support structure;

FIG. 6 is a partially broken end view of the pipe insulation coupling having an alternative locking mechanism in an unlocked condition for interconnecting the first and second clam shell portions of the coupling;

FIG. 7 is a partially broken end view of the pipe insulation coupling with the locking mechanism of FIG. 6 is a locked condition;

FIG. 10 is an end view of still another alternative embodiment of the pipe insulation coupling; and FIG. 11 is an end view of yet still another alternative embodiment of the pipe insulation coupling.

DETAILED DESCRIPTION OF THE PREFERRED EMBODIMENTS

Figure 1:
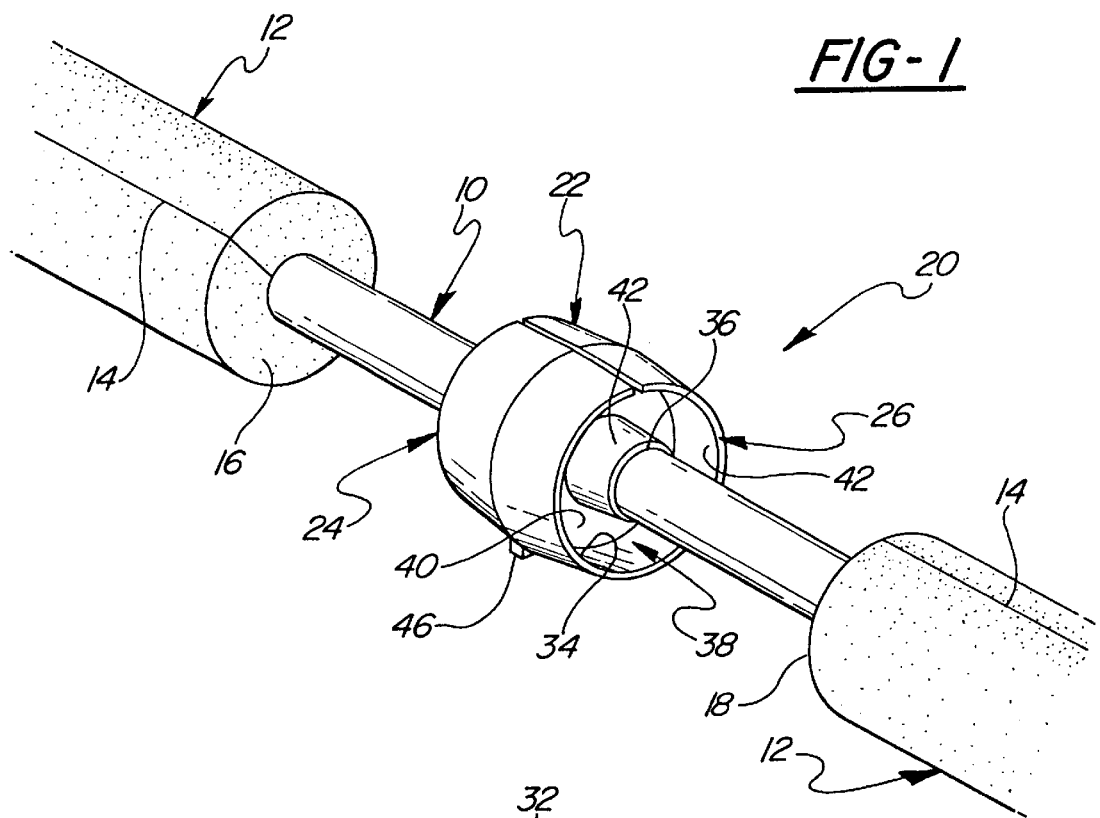
FIG. 1 is a perspective view of a pipe insulation coupling secured to an elongated pipe for coupling adjacent ends of pipe insulation tubing.

Referring to the Figures, wherein like numerals indicate like or corresponding parts throughout the several views, an elongated tubular pipe for transferring fluids therethrough is generally shown at 10 in FIG. 1. The pipe 10 is cylindrical, hollow and commonly of copper or aluminum construction such as that used for hydraulic pipes, pneumatic tubes, refrigeration lines, water pipes, and the like, as are typically known in the art. The pipe 10 is encased along its longitudinal length by elongated cellular foam pipe insulation tubing as shown at 12. The insulation tubing 12 is commonly provided in predetermined longitudinal lengths having a longitudinal open slit 14 for wrapping the tubing 12 around the pipe 10. The tubing 12 is commonly constructed of cellular polyurethane foam for insulating the fluid transferred through the pipe 10. A pair of elongated cellular pipe insulation tubing sections 12 are shown encased around the pipe 10 and having adjacent facing ends 16, 18.

Figure 2:
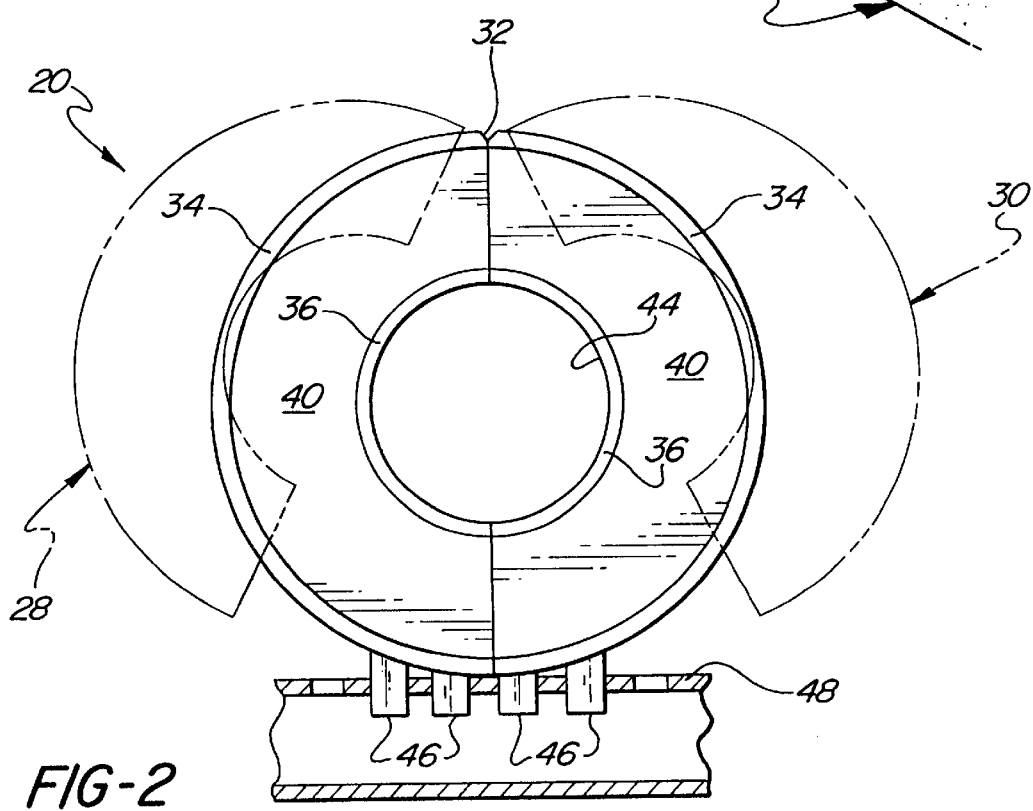
FIG. 2 is an end view of the pipe insulation coupling having a pair of clam shell portions shown pivotal between an open position and a closed position.
Figure 3:
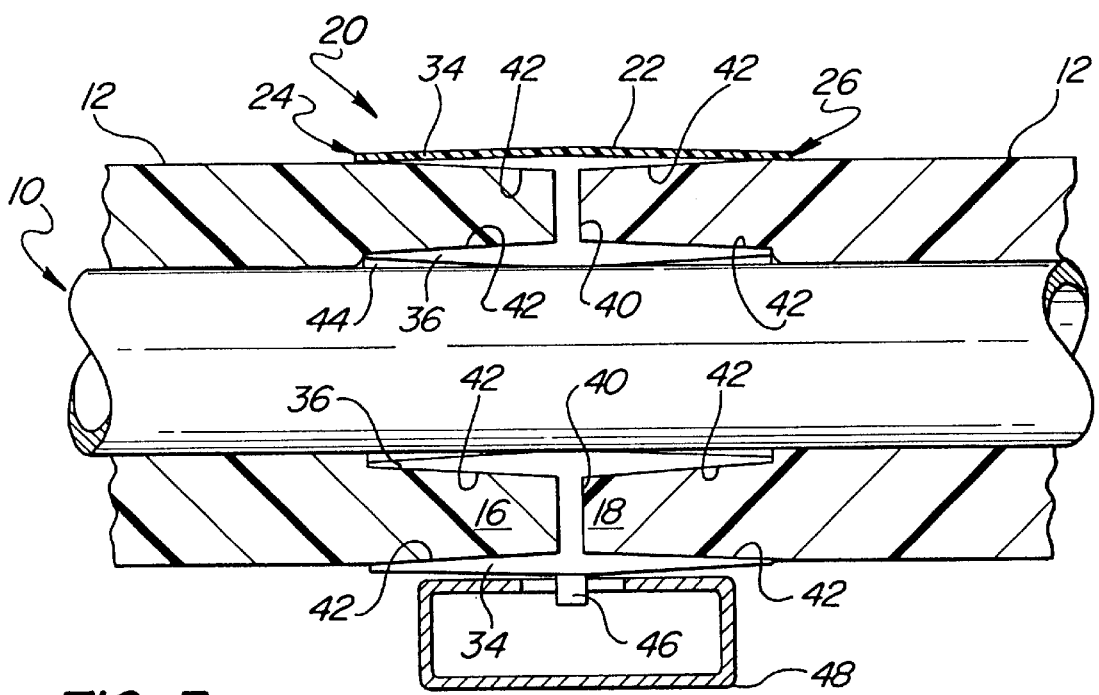
FIG. 3 is cross-sectional side view of the pipe insulation coupling secured to the elongated pipe and coupling adjacent ends of the pipe insulation coupling.
Figure 4:
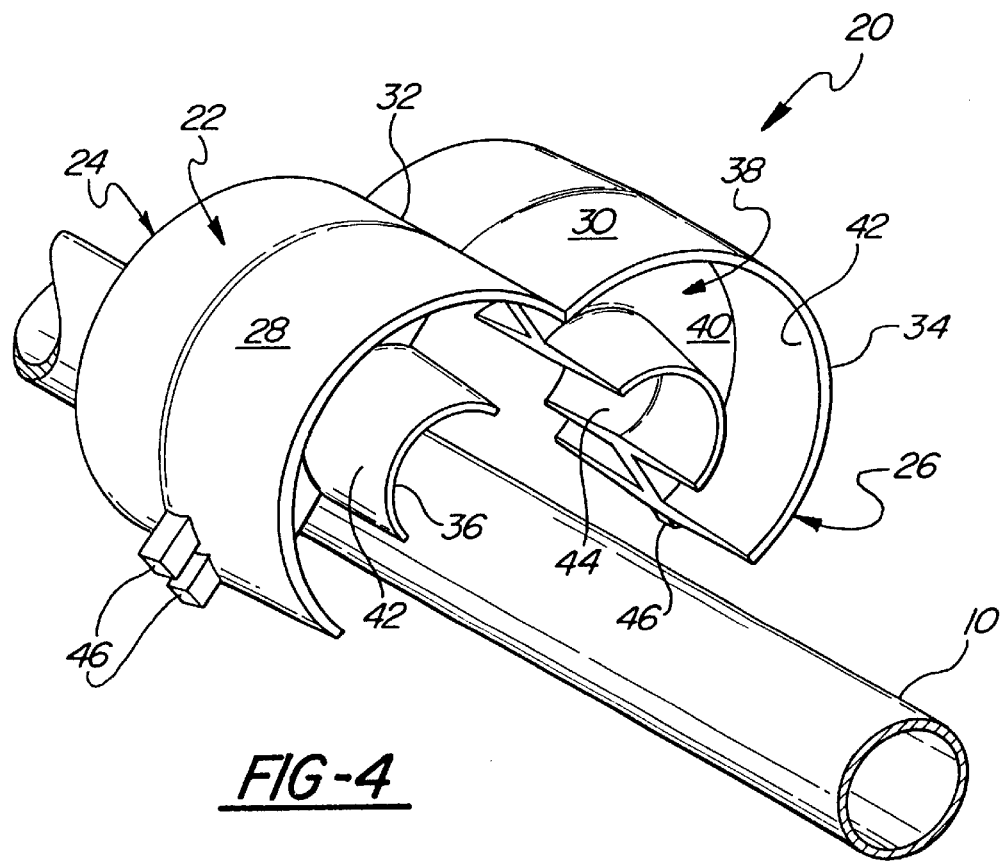
FIG. 4 is a perspective view of the pipe insulation coupling having the clam shell portions in the open position for receiving the elongated pipe and pipe insulation tubing.

Referring to FIGS. 1 and 4, a pipe insulation coupling is generally shown at 20 for coupling, or joining, the adjacent ends 16, 18 of the pipe insulation tubing 12. The coupling 20 is constructed of integrally molded plastic and comprises an elongated cylindrical body 22 extending along a longitudinal axis between a first end 24 adjacent to and aligned with the end 16 of the insulation tubing 12 and a second end 26 adjacent to and aligned with the end 18 of the insulation tubing 12. Referring also to FIG. 2, the elongated body 22 includes a first generally C-shaped clam shell portion 28 and a second generally C-shaped clam shell portion 30. A living hinge 32, such as a thin membrane of plastic material, interconnects the first clam shell portion 28 and second clam shell portion 30 longitudinally between the first 24 and second 26 ends for pivoting the clam shell portions 28, 30 from an open position to receive the pipe 10 and the pipe insulation tubing 12, as shown in FIGS. 2 and 4, and a closed position surrounding and coupled about the pipe 10 and the adjacent ends 16, 18 of the pipe insulation tubing 12, as shown in FIGS. 1, 2 and 3.

The first 28 and second 30 clam shell portions of the elongated body 22 each include an arcuate outer tube wall 34 extending along the longitudinal axis between the first end 24 and the second end 26 and an arcuate inner tube wall 36 spaced inwardly from and generally parallel to the outer tube wall 34 and also extending along the longitudinal axis between the first end 24 and the second end 26. In the closed position, the first 28 and second 30 clam shell portion abut together to form a cylindrical outer tube wall 34 and a cylindrical inner tube wall 36. The laterally spaced apart outer tube wall 34 and inner tube wall 36 define an elongated channel 38 therebetween for receiving the adjacent ends 16, 18 of the pipe insulation tubing 12.

Each of the clam shell portions 28, 30 of the coupling 20 also include a planar wall 40 positioned transverse to the longitudinal axis and interconnecting the outer tube wall 34 and the inner tube wall 36 midway between the first and second ends 24, 26 for abutting with the adjacent ends 16, 18 of the pipe insulation tubing 12. In other words, the planar wall 40 is formed integrally between the outer tube wall 34 and inner tube wall 36 and closes the channel 38 midway between the first end 24 and second end 26 to abut with the adjacent ends 16, 18 of the tubing 12.

Referring to FIGS. 3 and 4, the outer tube wall 34 and the inner tube wall 36 have tapered inner surfaces 42 extending from the planar wall 40 to each of the first and second ends 24, 26 for gradually decreasing the space between the outer tube wall 34 and the inner tube wall 36 defined by the channel 38 to frictionally retain the adjacent ends 16, 18 of the pipe insulation tubing 12 within the channel 38 along opposing sides of the planar wall 40. More specifically, the tapered inner surfaces 42 of the outer tube wall 34 and the inner tube wall 36 taper outwardly from each of the first and second ends 24, 26 to the planar wall 40 and decrease the space defined therebetween by the channel 38 such that the space between the outer tube wall 34 and the inner tube wall 36 is less adjacent the planar wall 40 than the space adjacent the first and second ends 24, 26. Therefore, the thickness of adjacent ends 16, 18 of the insulation tubing 12 surrounding the pipe 10 becomes increasingly compressed by the tapered inner surfaces 42 from the first and second ends 24, 26 to the planar wall 40 to frictionally retain the adjacent ends 16, 18 in the channel 38. Alternatively, only one or the other of the outer tube wall 34 or inner tube wall 36 may include the tapered inner surface 42 which is sufficiently tapered to compressed the insulation tubing 12 and frictionally retain the adjacent ends 16, 18 within the channel 38 of the coupling 20. Further, the inner surfaces of the outer tube wall 34 and the inner tube wall 36 may alternatively be parallel, without a taper, and dimensioned to frictionally retain the ends 16, 18 of the tubing 12 therein.

Referring the FIGS. 2, 3 and 4, the inner tube wall 36 also defines a center bore 44 when the clam shell portions 28, 30 are in the closed position. The center bore 44 extends longitudinally between the first and second ends 24, 26 for receiving the elongated cylindrical pipe 10 therethrough. Finally, the coupling 20 further includes a plurality of attachment tabs 46 extending outwardly from the elongated body 22 for securing the coupling 20, and thus, the pipe 10 and pipe insulation tubing 12 to a support structure 48. The attachment tabs 46 are fully set forth in applicant's U.S. Pat. No. 6,105,216, which is incorporated herein by reference in its' entirety.

In operation, the coupling 20 may couple or joined the adjacent ends 16, 18 of the insulation tubing 12 by first pivoting the clam shell portions 28, 30 from the open position to the closed position by the living hinge 32 to close the center bore 44 around the pipe 10 and secure the coupling 20 to the pipe 10. The insulation tubing 12 may then be encased around the pipe 10 along longitudinally opposing sides or ends 24, 26 of the coupling 20. The tubing 12 is slid along the pipe 10 until the adjacent ends 16, 18 are received in the channel 38 between the outer tube wall 34 and the inner tube wall 36. The planar wall 40 abuts and stops the adjacent ends 16, 18 of the tubing 12 within the coupling 20 and the tapered inner surfaces 42 frictionally retain the ends 16, 18 within the channel 38 of the coupling 20.

Referring to FIG. 5, an alternative embodiment of the pipe insulation coupling 20 is shown. The coupling 20 similarly includes an elongated cylindrical body portion 22 having a first generally C-shaped clam shell portion 28 and a second generally C-shaped clam shell portion 30. The hinge 32, such as a living hinge or thin portion of material, interconnects the first and second clam shell portion 28, 30 for pivoting the portions 28, 30 between the open and closed positions. When in the closed position, the clam shell portions 28, 30 of the body portion 22 include a cylindrical outer tube wall 34 and a cylindrical inner tube wall 36 spaced inwardly from and generally parallel to the outer tube wall 34 and defining an elongated channel 38 therebetween for receiving the adjacent ends 16, 18 of the pipe insulation tubing 12. The coupling 20 also includes a planar wall 40 positioned transverse to the longitudinal axis of the body portion 22 and interconnecting the outer tube wall 34 and the inner tube wall 36 generally midway between the ends thereof. The outer tube wall 34 and inner tube wall 36 may have parallel surfaces or tapered surfaces defined by the channel 38 to retain the adjacent ends 16, 18 of the pipe insulation tubing 12.

The alternative coupling 20 of FIG. 5 further includes an alignment tab 50 and a pair of attachment clips 52, 54 for aligning and securing the coupling 20 to a support structure 48. Specifically, the support structure 48 is a generally rectangular and hollow structure for securing and supporting the pipe 10 thereon and includes a plurality of spaced apart attachment holes 56, 58, 60 therein. The alignment tab 50 extends outwardly from the outer surface of the outer tube wall 34 and is received with the hole 56 for aligning the coupling 20 on the support structure 48. The attachment clips 52, 54 each include a base portion 62 projecting outwardly from the outer tube wall 34 and a hook portion 64 extending tangentially from the base portion 62. The base portion 62 is aligned and received in the respective hole 58, 60 and the hook portion 64 engages the peripheral wall or rim of the structure 48 formed by the hole 58, 60 to lockingly secure the coupling 20, pipe 10, and tubing 12, to the support structure 48. The support structure 48 is typically affixed to a wall for supporting one or more of the pipes 12 thereon.

Referring to FIGS. 6 and 7, one embodiment of a locking mechanism is shown at 70 for interconnecting the first clam shell portion 28 and second clam shell portion 30. Specifically, the locking mechanism 70 includes a locking tab 72 extending outwardly from the outer tube wall 34 on the first clam shell portion 28 for engaging with a locking hook 74 pivotally secured to the outer tube wall 34 on the second clam shell portion 30 between an unlocked condition, as shown in FIG. 6, and a locked condition, as shown in FIG. 7. The locking hook 74 is pivotally connected to the outer tube wall 34 on the second clam shell portion 30 by a living hinge 76, such as a thin membrane of plastic material, for pivotal movement between the unlocked condition spaced and disengaged from the locking tab 72 and the locked condition engaging the locking tab 72 to interconnect and close the first claim shell portion 28 and second clam shell portion 30 around the pipe insulation tubing 12. It should be appreciated, however, that may variations and configurations of locking mechanism may be used for interconnecting the portions 28 and 30 without varying from the scope of the invention.

Figure 8:
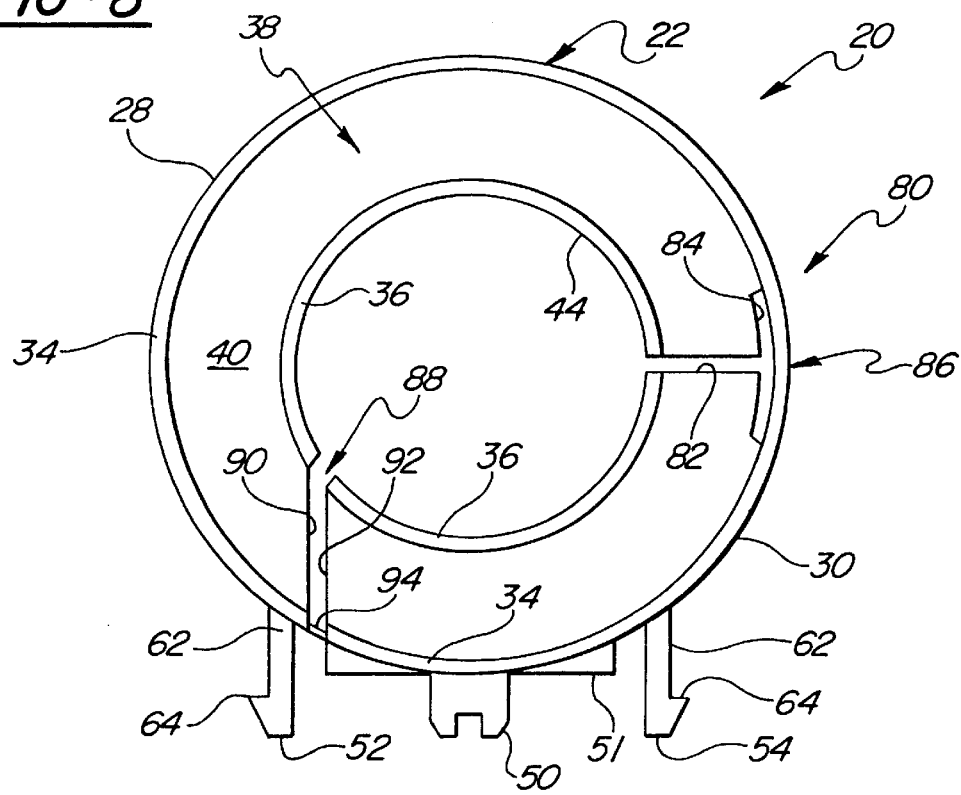
FIG. 8 is an end view of another alternative embodiment of the pipe insulation coupling.

Referring to FIG. 8, another alternative embodiment of a pipe insulation coupling 20 is shown. The coupling 20 of FIG. 8 is substantially similar to the coupling of FIG. 5, and therefore, the differences will mainly be discussed in detail. The coupling 20 includes an elongated cylindrical body portion 22 having a first generally C-shaped clam shell portion 28 and a second generally C-shaped clam shell portion 30. A hinge 80 interconnects the first and second clam shell portion 28, 30 for pivoting the portions 28, 30 between the open and closed positions. When in the closed position, the clam shell portions 28, 30 of the body portion 22 include a cylindrical outer tube wall 34 and a cylindrical inner tube wall 36 spaced inwardly from and generally parallel to the outer tube wall 34 and defining an elongated channel 38 therebetween for receiving the adjacent ends 16, 18 of the pipe insulation tubing 12. The coupling 20 also includes a planar wall 40 positioned transverse to the longitudinal axis of the body portion 22 and interconnecting the outer tube wall 34 and the inner tube wall 36 generally midway between the ends thereof. The outer tube wall 34 and inner tube wall 36 may have parallel surfaces or tapered surfaces defined by the channel 38 to retain the adjacent ends 16, 18 of the pipe insulation tubing 12. The alternative coupling 20 of FIG. 8 further includes an alignment tab 50 and a pair of attachment clips 52, 54 for aligning and securing the coupling 20 to a support structure 48, as previously shown and described in FIG. 5. The alignment tab 50 extends outwardly from a planar block or seat 51 affixed to the outer surface of the outer tube wall 34 and is received with the hole 56 for aligning the coupling 20 on the support structure 48. The attachment clips 52, 54 each include a base portion 62 projecting outwardly from the outer tube wall 34 and a hook portion 64 extending tangentially from the base portion 62. The base portion 62 is aligned and received in the respective hole 58, 60 and the hook portion 64 engages the peripheral wall or rim of the structure 48 formed by the hole 58, 60 to lockingly secure the coupling 20, pipe 10, and tubing 12, to the support structure 48. The support structure 48 is typically affixed to a wall for supporting one or more of the pipes 12 thereon.

The hinge 80 interconnecting the clam shell portions 28, 30 includes a generally T-shaped slot formed in the planar wall 40. The hinge 80 may be positioned at any desired design location about the circumferential perimeter of the coupling 20. More specifically, the T-shaped slot, or hinge, is defined by a first slot 82 extending from and through the inner tube wall 36 and through the planar wall 40 to the outer tube wall 34. The first slot 82 terminates at a second arcuate shaped slot 84 in the planar wall 40 immediately adjacent and parallel to the outer tube wall 34. Depending on the overall circumferential length of the second slot 84, the hinge 80 is formed by an elongated arcuate section of the outer tube wall 34 illustrated at 86, thereby providing a rolling hinge between the portions 28, 30 rather than a single crease or point living hinge similar to that shown in FIG. 5. The rolling hinge 80 shown in FIG. 8 provides smooth and easy movement of the portions 28, 30 between the opened and closed position regardless of the diameter of the coupling 20 and reduces wear and fatigue on the material forming the hinge by the outer tube wall 34.

The first and second clam shell portions 28, 30 are further separated by an opening or slot 88 spaced radially from the hinge 80 and defining facing ends 90, 92 of the clam shell portions 28, 30, respectively. The slot 88 extends through the inner tube wall 36 and planar wall 40 to the outer tube wall 34. The facing ends 90, 92 may be joined by a fracturable thin web portion 94 of the outer tube wall 34. The coupling 20 may be molded with or without the web portion 94 of the outer tube wall 34. That is, the slot 88 may extend through and between both the inner tube wall 36 and the outer tube wall 34.

In operation, if the pipe 10 is already assembled and installed as desired, the coupling 20 may couple or joined the adjacent ends 16, 18 of the insulation tubing 12 by first fracturing the web portion 94 of the outer tube wall 34 in order to facilitate pivoting of the clam shell portions 28, 30 from the open position to the closed position by the hinge 80 to close the center bore 44 around the pipe 10 and secure the coupling 20 to the pipe 10. The insulation tubing 12 may then be encased around the pipe 10 along longitudinally opposing sides or ends 24, 26 of the coupling 20. The tubing 12 is slid along the pipe 10 until the adjacent ends 16, 18 are received in the channel 38 between the outer tube wall 34 and the inner tube wall 36. The planar wall 40 abuts and stops the adjacent ends 16, 18 of the tubing 12 within the coupling 20 and the tapered inner surfaces 42 frictionally retain the ends 16, 18 within the channel 38 of the coupling 20. If the pipe 10 and insulation tubing 12 have been preinstall and assembled, the web portion 94 may be left intact to provide a more rigid and stable solid piece coupling 20. The coupling 20 is then simply positioned to receive the pipe 10 through the center bore 44 and the adjacent ends 16, 18 of the tubing 12 within the channel 38 and against opposing sides of the planar wall 40.

Figure 9:
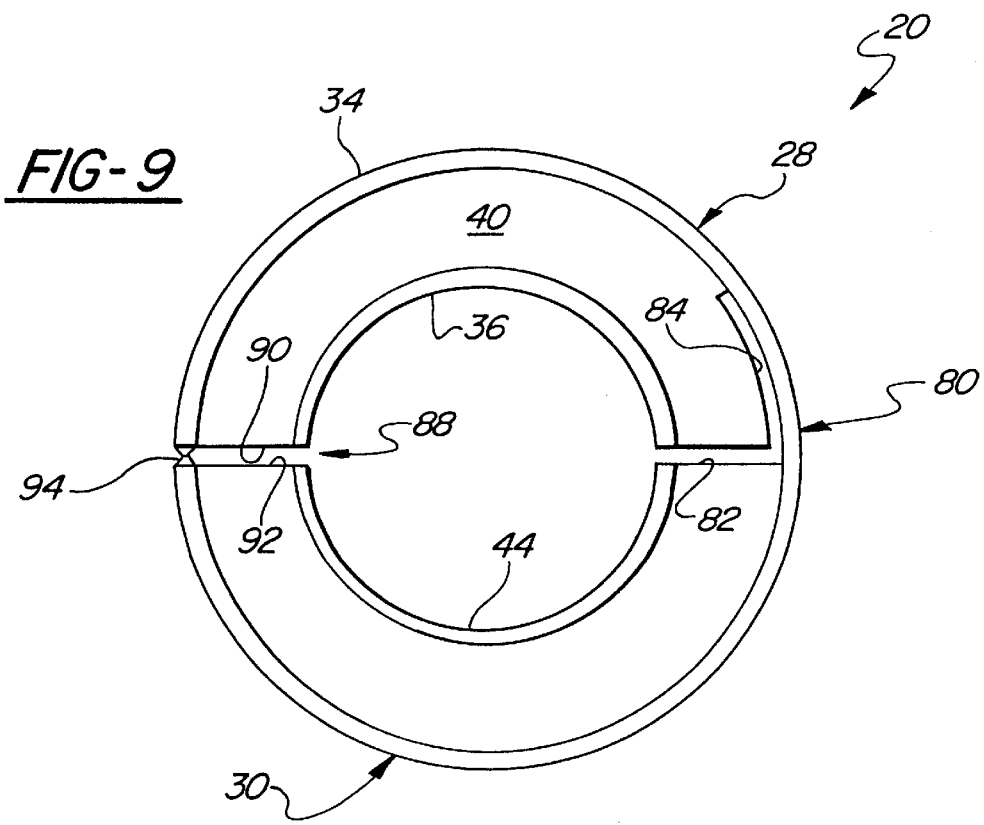
FIG. 9 is an end view of yet another alternative embodiment of the pipe insulation coupling.

Referring to FIG. 9, yet another alternative embodiment of the pipe insulation coupling is shown at 20. Again, the coupling 20 includes a cylindrical inner tube wall 36 defining a center bore 44 and a generally parallel outer tube wall 34 spaced from the inner tube wall 36 by a perpendicular planar wall 40. The coupling 20 includes a first clam shell portion 28 and a second clam shell portion 30 interconnected by a hinge 80. The hinge 80 of the alternative embodiment of FIG. 9 includes a generally L-shaped slot defined by a first slot 82 extending through the inner tube wall 36 and planar wall 40 to the outer tube wall 34. The first slot 82 terminates at a second arcuate slot 84 adjacent and parallel to the outer tube wall. Radially opposite the hinge 80, the first and second clam shell portions 28, 30 are further separated by an opening or slot 88 spaced radially from the hinge 80 and defining facing ends 90, 92 of the clam shell portions 28, 30, respectively. The slot 88 extends through the inner tube wall 36 and planar wall 40 to the outer tube wall 34. The facing ends 90, 92 may be joined by a fracturable thin web portion 94 of the outer tube wall 34. The coupling 20 may be molded with or without the web portion 94 of the outer tube wall 34. That is, the slot 88 may extend through and between both the inner tube wall 36 and the outer tube wall 34

Referring to FIG. 10, still another alternative embodiment of the pipe insulation coupling is shown at 20. The coupling 20 includes a cylindrical inner tube wall 36 defining a center bore 44 and a generally parallel outer tube wall 34 spaced from the inner tube wall 36 by a central planar wall 40. The coupling 20 includes a slot 88 extending linearly through and between the inner tube wall 36 and outer tube wall 34. A fracturable web portion 94 may extend across the slot 88 and interconnect the outer tube wall 34 between the slot 88. The coupling 20 of FIG. 10 includes a pair of hinges 80a and 80b. The hinges 80a, 80b are radially spaced apart and defined by generally L-shaped slots similar to the hinge 80 of FIG. 9. Each hinge 80a, 80b includes a linear slot portion 82 extending through the planar wall 40 between the inner tube wall 36 and the outer tube wall 34 and an arcuate slot 84 intersecting the end of the linear slot 82 and generally parallel and adjacent to the outer tube wall 34. A thin fracturable web portion 85 may extend across the slot 82 interconnecting the sections of the inner tube wall 36, either one of which may be fractured to provide opening and closing of the hinge 80a, 80b. The pair of hinges 80a, 80b provide a double hinged coupling 20 for additional flexibility and versatility when operating between the open position and the closed position around the pipe 12.

Finally, referring to FIG. 11, yet still another alternative embodiment of a pipe insulation coupling is shown at 20. Again, the coupling 20 includes a cylindrical inner tube wall 36 defining a center bore 44 and a generally parallel outer tube wall 34 spaced from the inner tube wall 36 by a center planar wall 40. The coupling includes a slot 88 extending linearly through and between the inner tube wall 36 and outer tube wall 34. A fracturable web portion 94 may extend across the slot 88 and interconnect one or both of the outer tube wall 34 and/or inner tube wall 36 between the slot 88. The coupling 20 of FIG. 11 includes a plurality of hinges 80a, 80b, 80c, 80d. The hinges 80a, 80b, 80c, 80d are radially spaced apart and include both the generally L-shaped slots similar to the hinge 80 of FIG. 9 and the T-shaped slots similar to the hinge 80 of FIG. 8. Each hinge 80a, 80b includes a linear slot portion 82 extending through the planar wall 40 between the inner tube wall 36 and the outer tube wall 34 and an arcuate slot 84 intersecting the linear slot 82 and generally parallel and adjacent to the outer tube wall 34. A thin fracturable web portion 85 may extend across the slot 82 interconnecting the sections of the inner tube wall 36, either one of which may be fractured to provide opening and closing of the hinge 80a, 80b. The plurality of hinges 80a, 80b, 80c, 80d provide a multiple hinged coupling 20 for additional flexibility and versatility when operating between the open position and the closed position around the pipe 12.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A pipe insulation coupling for coupling adjacent ends of elongated pipe insulation tubing comprising:
    an elongated body extending along a longitudinal axis between a first end and a second end, said elongated body including;
        a cylindrical outer tube wall extending along said longitudinal axis between said first end and said second end,
        a cylindrical inner tube wall spaced inwardly from and generally parallel to said outer tube wall and extending along said longitudinal axis between said first end and said second end, said inner tube wall and said outer tube wall defining an elongated channel therebetween adapted to receive adjacent ends of pipe insulation tubing,
        a planar wall positioned transverse to said longitudinal axis for interconnecting said outer tube wall and said inner tube wall midway between said first and second ends and adapted to abut the adjacent ends of the pipe insulation tubing, and
        at least one of said outer tube wall and said inner tube wall having a tapered inner surface extending from said planar wall to each of said first and second ends for gradually decreasing the space between said outer tube wall and said inner tube wall defined by said channel to frictionally retain the adjacent ends of the pipe insulation tubing within said channel along opposing sides of said planar wall.

2. A pipe insulation coupling as set forth in claim 1 wherein each of said outer tube wall and said inner tube wall includes a tapered inner surface extending from said planar wall to each of said first and second ends for gradually decreasing the space between said outer tube wall and said inner tube wall defined by said channel.

3. A pipe insulation coupling as set forth in claim 2 wherein said tapered inner surfaces of said outer tube wall and said inner tube wall taper outwardly from each of said first and second ends to said planar wall to decrease the space defined by said channel such that the space between said outer tube wall and said inner tube wall is less adjacent said planar wall than the space adjacent said first and second ends.

4. A pipe insulation coupling as set forth in claim 3 wherein said inner tube wall defines a center bore extending longitudinally between said first and second ends adapted to receive an elongated cylindrical pipe encapsulated by the pipe insulation tubing therethrough.

5. A pipe insulation coupling as set forth in claim 4 wherein said elongated body includes a first generally C-shaped clam shell portion and a second generally C-shaped clam shell portion.

6. A pipe insulation coupling as set forth in claim 5 wherein said elongated body includes a living hinge interconnecting said first and second clam shell portions longitudinally between said first and second ends for pivoting said clam shell portions from an open position adapted to receive the pipe and pipe insulation tubing and a closed position coupled about the pipe and adjacent ends of the pipe insulation tubing.

7. A pipe insulation coupling as set forth in claim 6 further including attachment tab extending outwardly from said elongated body adapted to secured said coupling to a support structure.

8. A pipe insulation coupling for coupling adjacent ends of elongated pipe insulation tubing surrounding a tubular pipe comprising:
    an elongated body extending along a longitudinal axis between a first end and a second end, said elongated body includes a first generally C-shaped clam shell portion, a second generally C-shaped clam shell portion and a living hinge interconnecting said first and second clam shell portions longitudinally between said first and second ends for pivoting said clam shell portions from an open position adapted to receive the pipe and pipe insulation tubing and a closed position coupled about the pipe and adjacent ends of the pipe insulation tubing, said first and second clam shell portions of said elongated body portion each including;
        a cylindrical outer tube wall extending along said longitudinal axis between said first end and said second end,
        a cylindrical inner tube wall spaced inwardly from and generally parallel to said outer tube wall and extending along said longitudinal axis between said first end and said second end, said inner tube wall and said outer tube wall defining an elongated channel therebetween adapted to receive adjacent ends of pipe insulation tubing, a planar wall positioned transverse to said longitudinal axis for interconnecting said outer tube wall and said inner tube wall midway between said first and second ends and adapted to abut the adjacent ends of the pipe insulation tubing, and at least one of said outer tube wall and said inner tube wall having a tapered inner surface extending from said planar wall to each of said first and second ends for gradually decreasing the space between said outer tube wall and said inner tube wall defined by said channel to frictionally retain the adjacent ends of the pipe insulation tubing within said channel along opposing sides of said planar wall.

9. A pipe insulation coupling as set forth in claim 8 wherein each of said outer tube wall and said inner tube wall includes a tapered inner surface extending from said planar wall to each of said first and second ends for gradually decreasing the space between said outer tube wall and said inner tube wall defined by said channel.

10. A pipe insulation coupling as set forth in claim 9 wherein said tapered inner surfaces of said outer tube wall and said inner tube wall taper outwardly from each of said first and second ends to said planar wall to decrease the space defined by said channel such that the space between said outer tube wall and said inner tube wall is less adjacent said planar wall than the space adjacent said first and second ends.

11. A pipe insulation coupling as set forth in claim 10 wherein said inner tube wall defines a center bore extending longitudinally between said first and second ends adapted to receive an elongated cylindrical pipe encapsulated by the pipe insulation tubing therethrough.

12. In combination, a pipe and pipe insulation coupling for coupling adjacent ends of elongated pipe insulation tubing comprising:

an elongated tubular pipe for transferring fluids therethrough;

at least a pair of elongated cellular pipe insulation tubing encased about said pipe and having adjacent facing ends;

a pipe insulation coupling for coupling said adjacent ends of said pipe insulation tubing comprising an elongated body extending along a longitudinal axis between a first end and a second end, said elongated body including;

a cylindrical outer tube wall extending along said longitudinal axis between said first end and said second end, a cylindrical inner tube wall spaced inwardly from and generally parallel to said outer tube wall and extending along said longitudinal axis between said first end and said second end, said inner tube wall and said outer tube wall defining an elongated channel therebetween for receiving said adjacent ends of said pipe insulation tubing, a planar wall positioned transverse to said longitudinal axis for interconnecting said outer tube wall and said inner tube wall midway between said first and second ends for abutting with said adjacent ends of said pipe insulation tubing, and at least one of said outer tube wall and said inner tube wall having a tapered inner surface extending from said planar wall to each of said first and second ends for gradually decreasing the space between said outer tube wall and said inner tube wall defined by said channel to frictionally retain said adjacent ends of said pipe insulation tubing within said channel along opposing sides of said planar wall.

13. A combination as set forth in claim 12 wherein each of said outer tube wall and said inner tube wall includes a tapered inner surface extending from said planar wall to each of said first and second ends for gradually decreasing the space between said outer tube wall and said inner tube wall defined by said channel.

14. A combination as set forth in claim 13 wherein said tapered inner surfaces of said outer tube wall and said inner tube wall taper outwardly from each of said first and second ends to said planar wall to decrease the space defined by said channel such that the space between said outer tube wall and said inner tube wall is less adjacent said planar wall than the space adjacent said first and second ends.

15. A combination as set forth in claim 14 wherein said inner tube wall defines a center bore extending longitudinally between said first and second ends for receiving said elongated cylindrical pipe therethrough.

16. A pipe insulation coupling as set forth in claim 15 wherein said elongated body includes a first generally C-shaped clam shell portion and a second generally C-shaped clam shell portion.

17. A pipe insulation coupling as set forth in claim 16 wherein said elongated body includes a living hinge interconnecting said first and second clam shell portions longitudinally between said first and second ends for pivoting said clam shell portions from an open position to receive said pipe and said pipe insulation tubing and a closed position coupled about said pipe and said adjacent ends of said pipe insulation tubing.

18. A pipe insulation coupling as set forth in claim 17 further including attachment tab extending outwardly from said elongated body for securing said coupling, pipe and pipe insulation tubing to a support structure.

* * * * *